Figure 1:
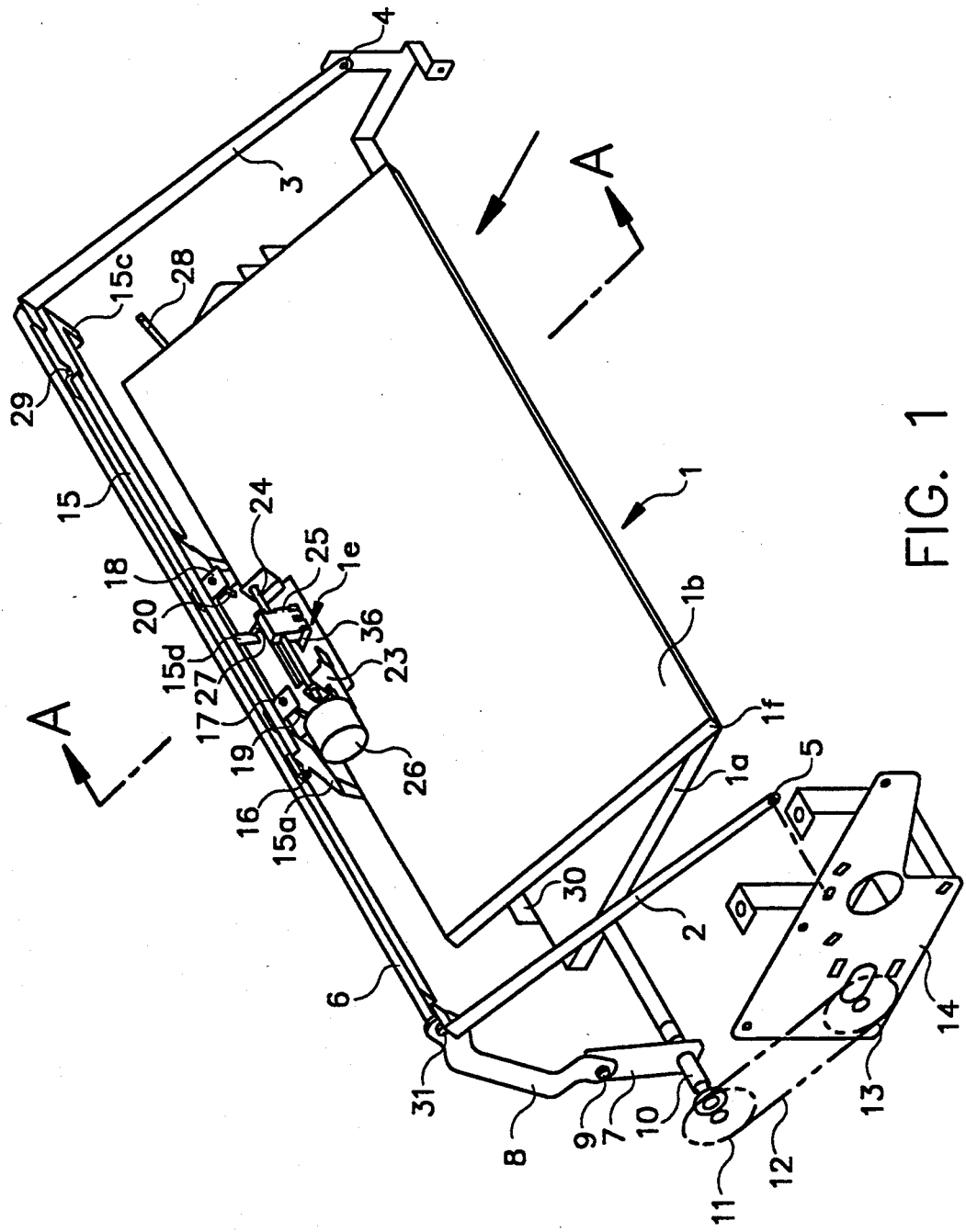

United States Patent [19]
Schölpple et al.

[11] Patent Number: 5,402,997
[45] Date of Patent: Apr. 4, 1995

[54] DEVICE FOR OPENING AND CLOSING A SHEET-FILM CASSETTE

[75] Inventors: Gunther Schölpple, Schlierbach; Friedrich Ueffinger, Schorndorf-Weiler, both of Germany

[73] Assignee: Eastman Kodak Company, Rochester, N.Y.

[21] Appl. No.: 915,712

[22] PCT Filed: Nov. 15, 1991

[86] PCT No.: PCT/EP91/02156

§ 371 Date: Jul. 21, 1992

§ 102(e) Date: Jul. 21, 1992

[87] PCT Pub. No.: WO92/09925

PCT Pub. Date: Jun. 11, 1992

[30] Foreign Application Priority Data

Nov. 23, 1990 [DE] Germany ............ 40 37 378.9

[51] Int. Cl.[6] .................................................. B65H 1/00
[52] U.S. Cl. .................................... 271/145; 271/162; 74/20; 74/21
[58] Field of Search ............ 271/145, 162; 74/20, 74/21; 354/319, 276, 281; 378/188

[56] References Cited

U.S. PATENT DOCUMENTS

| | | | |
|---|---|---|---|
| 4,895,357 | 1/1990 | Lippold | 271/145 X |
| 5,145,166 | 9/1992 | Neudecker et al. | 271/145 X |
| 5,149,078 | 9/1992 | Matsuda et al. | 271/145 |

FOREIGN PATENT DOCUMENTS

| | | | |
|---|---|---|---|
| 597637 | 1/1984 | Japan | 271/145 |
| 61-127530 | 1/1986 | Japan | 271/145 |
| 8809525 | 12/1988 | WIPO | |

*Primary Examiner*—David H. Bollinger
*Attorney, Agent, or Firm*—Dana M. Schmidt

[57] ABSTRACT

The device comprises a support element (6) arranged in parallel with the free end of a cassette lid (1b) which is to be opened. The support element is driven by a lever gear (7, 8, 9, 33, 34, 35) and, guided on arms (2, 3), can be lifted and lowered. Spring-biased pressure bolts (19, 20) guided on the support element (6) serve to reduce the pressure exerted on the cassette locking mechanism (1c, 1d) during unlocking as well as to close the cassette 1. A mounting plate (23) on which an unlocking member (25, 36) and its driving rotary magnet (26) are arranged is spring-biased into contact with the pressure bolts (19, 20). Moreover, an opening element (15) with check arms (15a, 15b) associated with the cassette lid (1b) is also pivotably mounted on the support element (6) and can be brought into an operative position in response to the position of the unlocking member (25, 36) and the position of the support element (6) respectively.

2 Claims, 5 Drawing Sheets

DEVICE FOR OPENING AND CLOSING A SHEET-FILM CASSETTE

The invention relates to a device for opening and closing a sheet-film cassette with two cassette portions connected by a hinge and a locking member pivotally mounted at the free end of the cassette lid, said device comprising an unlocking member associated with said locking member and spring-biased pressure bolts associated with the area of the locking member and acting vertically on the cassette lid as well as an opening element pivoting the cassette lid into its open position.

In a device of this type, which has been disclosed in DE-37 17 786-A1, the closing force of the cassette's locking mechanism is reduced in that the lid is depressed by means of pressure bolts so that said mechanism can be operated without much force being exerted and without being subjected to much wear and tear. The unlocking member of this known device is guided over a constant path of movement so that it cannot be adapted to different tolerance-dependent positions of the locking member to be engaged.

It is the object of the invention to provide a device of the generic type such that the unlocking member always engages the locking member of the cassette in a position not affected by tolerance variations.

In accordance with the invention this object is obtained in that the unlocking member together with its drive is arranged on a mounting plate, said mounting plate is spring-biased into contact with the pressure bolts, said pressure bolts are mounted and guided on a U-shaped bracket, said U-shaped bracket is attached to a support element guided for movement in parallel with the free end of the cassette lid and the opening element is arranged on said support element.

According to a useful modification of the invention the opening element has the shape of an angular lever which engages below the cassette lid and is pivotably associated with said lid such that it is brought into a functionally useful position in response to the position of the unlocking member and the position of the support element respectively.

According to a further useful modification the support element is attached to the free ends of stationarily mounted arms and is moved up and down by a lever gear driven by a motor.

In a particularly advantageous manner the unlocking member is provided with a wedge-shaped spring-biased operating element which is movably mounted and has a concave operating surface.

Figure 2:
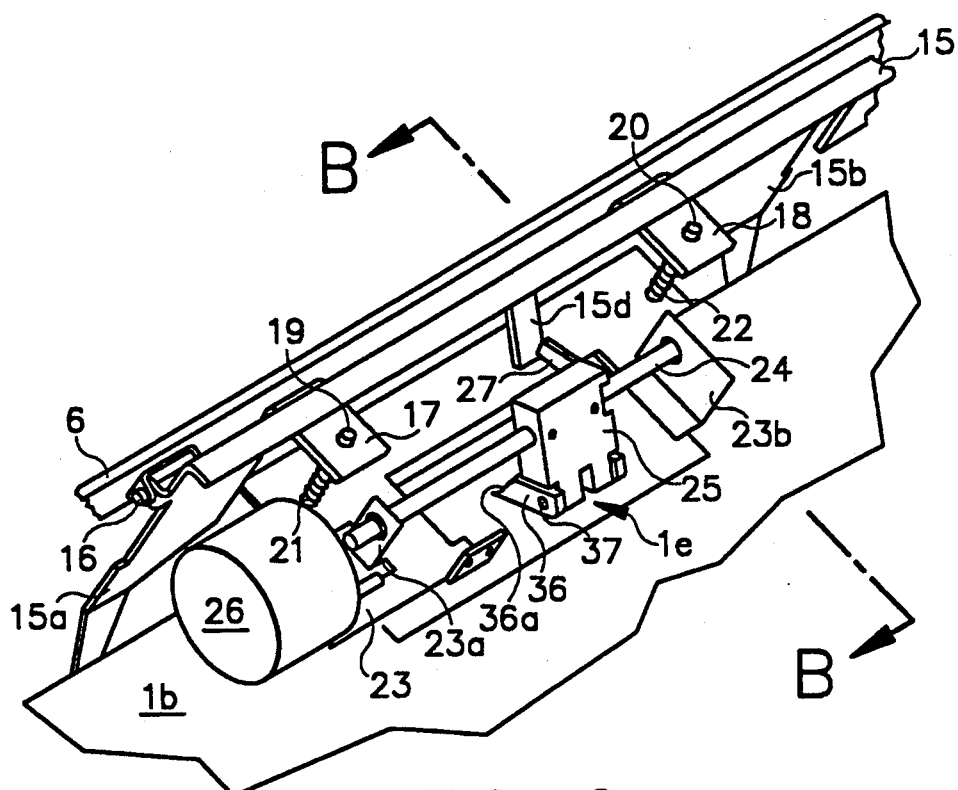
Figure 3:
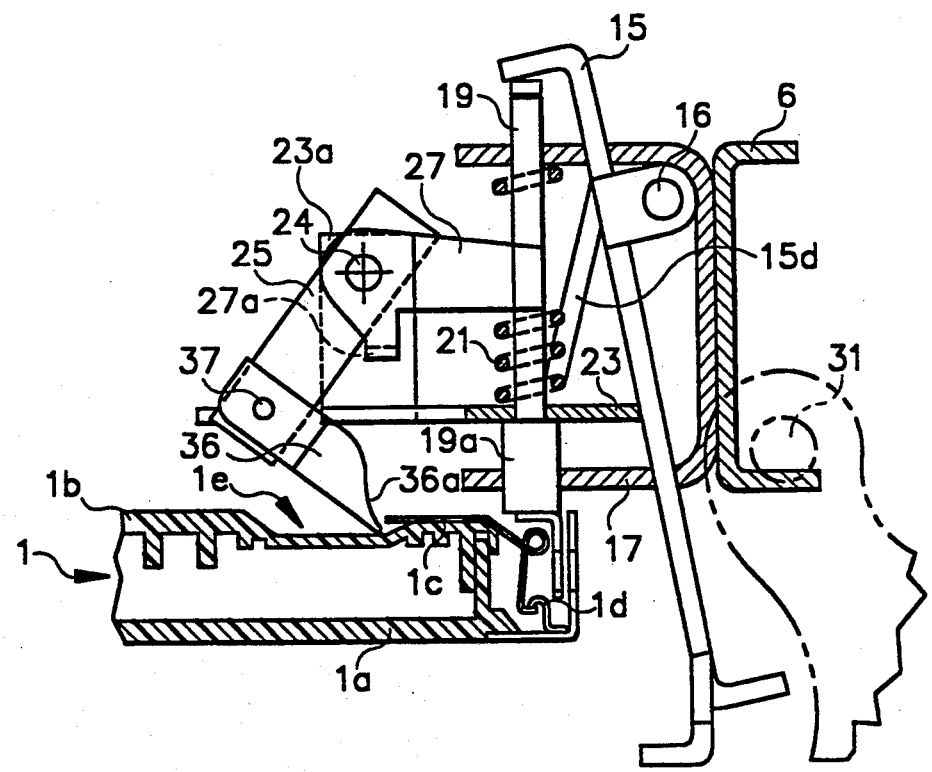
Figure 4:
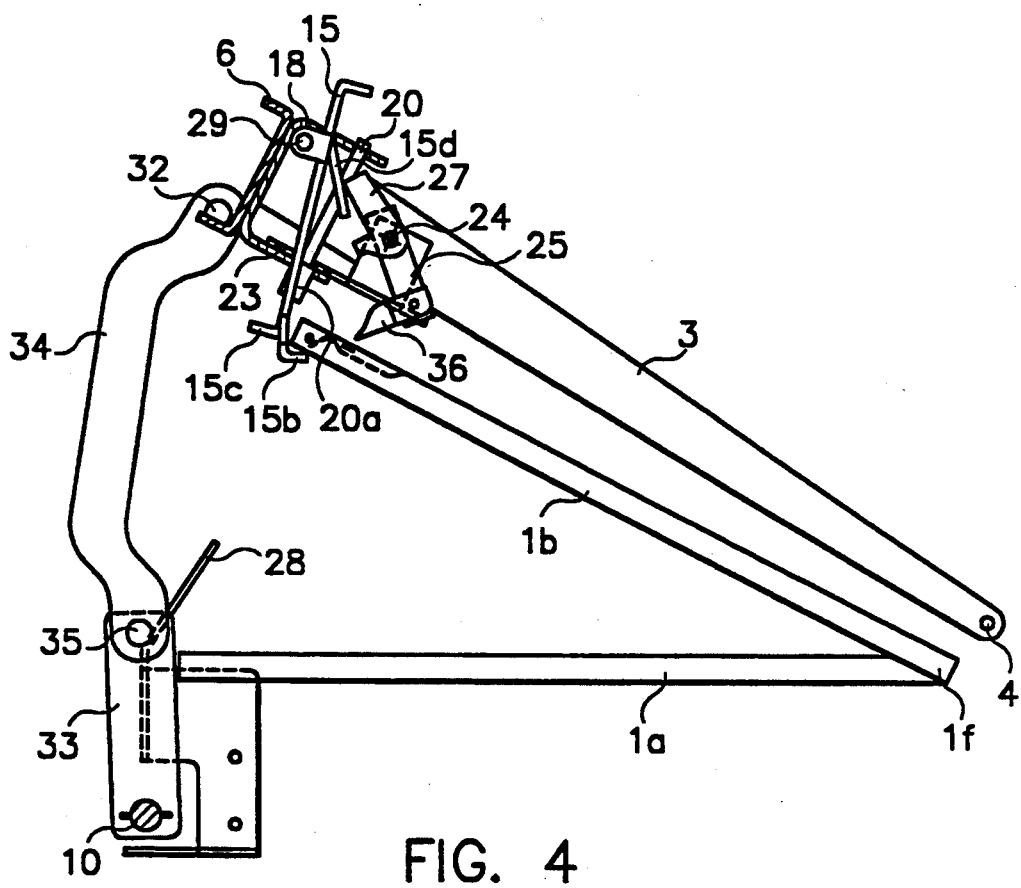

Further features and advantages can be inferred from the description of an embodiment illustrated in the drawing and from the subclaims. The drawing shows schematically in FIG. 1 an oblique view of the device with the cassette in its open position;

FIG. 2 a partial view of the device according to FIG. 1;

FIG. 3 a partial view of the device according to FIG. 2, showing a longitudinal section along line B—B, however at the beginning of the unlocking operation;

FIGS. 4 longitudinal sectional views taken along line A—A of the device to 9 according to FIG. 1 and illustrating the different steps of the unlocking, opening and closing operations.

The device according to the invention forms part of a known unit not illustrated for automatically loading and unloading X-ray sheet film cassettes 1 wherein an exposed sheet film is removed from a cassette 1 and fed to a film processing unit not illustrated whereupon the empty cassette 1 is loaded with another sheet film which has been removed from a supply magazine arranged within the unit.

The known cassette 1 which is to be handled consists of two cassette portions 1a, 1b which are connected by a hinge if and can be locked in their closing position by a locking member 1c. The locking member 1c which is pivotally mounted on the cassette lid 1b and spring-biased in the direction of closing engages a locking hook 1d arranged in the lower portion 1a of the cassette, see in particular FIG. 3. The cassette portions 1a, 1b are closable in opposition to an inherent bias which causes the cassette portions 1a, 1b to snap open easily when cassette 1 is unlocked. In the area of locking member 1c, lid 1b is provided with a recessed portion 1e which allows the operator to reach below locking member 1c.

By known means not illustrated cassette 1 is moved in the direction of the arrow "C" up to an abutment member 30 provided at the end side. Lateral alignment elements not illustrated align the cassette 1 in a central position so that the centrally arranged locking member 1c is positioned in the path of movement of an unlocking member 25, 36 to be described further below. Sensors not illustrated which are positioned at the end side and laterally of the cassette 1 determine whether cassette 1 has been brought into its intended position and also serve for size detection (sheet film size), the values determined being transferred to a function control device of a type known per se.

In the area of the properly positioned cassette 1, arms 2 and 3 respectively are mounted on either side of the cassette for pivotal movement about stationary bearings 4 and 5 respectively, said arms being connected with each other at their other ends by a support element 6.

At both ends of support element 6, bearings 31, 32 are arranged to which a lever gear each is hinged which comprises two levers 7, 8 and 33, 34 respectively connected with each other by a link 9 and 35 respectively.

The lever gear 7, 8, 9 and 33, 34, 35 respectively is driven via a driving shaft 10 positively engaging the levers 7 and 33 and driven via a chain-wheel gear 11, 12, 13, shown in dotted lines, by a motor not illustrated which is mounted to a holder 14.

Support element 6 mounts the means used for unlocking, opening and closing of cassette 1, which will be described below, in particular with reference to FIGS. 2, 3 and 5.

Two identical U-shaped brackets 17, 18 symmetrically aligned with the center of the cassette are mounted on support element 6, with a pressure bolt 19 and 20 respectively being guided for sliding movement on each of said brackets.

As can be seen in particular in FIG. 3, the pressure bolts 19, 20 have enlarged pressure portions 19a and 20a respectively which are associated with the cassette 1. A mounting plate 23 is biased by pressure springs 21, 22 into contact with the upper side of said pressure portions or —when the device is in its rest position as shown in FIG. 4—into contact with the inner sides of the lower arms of the U-shaped brackets 17, 18. The pressure springs 21, 22 are biased between the arms of the U-shaped brackets 17, 18 and the pressure bolts 19, 20 are held in position by locking washers of a type known per se.

On the mounting plate 23, bent-off portions 23a, 23b are arranged on which a shaft 24 is mounted for rotation about correspondingly designed journals. The shaft 24 is driven by a rotary magnet 26 secured to the mounting plate 23.

As illustrated in FIG. 3 an unlocking member 25 which is rigidly connected with shaft 24 and arranged thereon comprises an operating member 36 pivotally mounted about a journal 37 and spring-biased clockwise. The operating member 36 is provided with a wedge-shaped and concave operating surface 36a. A pawl 27 also pivotally mounted on shaft 24 has a bent-off lug 27a by which the pawl is biased clockwise into contact with the unlocking member 25 by a spring not illustrated.

Also mounted on support element 6 is the opening element 15 which is pivotable about journals 16 and 29. The opening element 15 has two identically shaped check arms 15a, 15b (see FIGS. 1 and 2) which are symmetrically aligned with the center of the cassette and spring-biased for movement below cassette lid 1b. Moreover, a control arm 15c which is biased counterclockwise by springs not illustrated and associated with a stationary, inclined ramp 28 is also arranged on opening element 15. Support element 6 moreover has a projection 15d which is associated with the pawl 27 of unlocking member 25, 36.

The device functions as follows:

When in its starting position the opening device assumes the upper position (without cassette) illustrated in FIGS. 1 and 4. However, in contrast to Figs. 1 and 4, pawl 27 is in its locking position (see FIG. 5) because no unlocking operation has taken place immediately before the upward movement. The check arms 15a, 15b of the opening element 15 are thus fixed in a position in which they are pivoted out of the way and inoperative.

After a closed cassette 1 has been fed in in the direction of the arrow "C" and positioned as described at the beginning and the proper position of cassette 1 has been determined the control device not illustrated generates a starting signal which starts the opening device. For that purpose the motor not illustrated is started which drives the driving shaft 10 counterclockwise via the chain-wheel gear 11, 12, 13. During this operation support element 6 is guided by the arms 2, 3 and lowered via the lever gear 7, 8, 9 and 33, 34, 35 respectively. Its movement is continued until the lower end position of the lever gear 7, 8, 9 and 33, 34, 35 respectively shown in FIG. 5 has been reached in which the motor is stopped by a limit switch not illustrated.

When the support element 6 pivots downwards the control arm 15c of the opening element 15 abuts the oblique ramp 28 and, sliding along said ramp, pivots the opening element 15 clockwise back into an end position in which its projection 15d is separated from pawl 27. FIG. 5 shows that when the pressure portions 19a, 20a are placed on cassette 1 the pressure bolts 19, 20 are urged upwards in opposition to the action of the pressure springs 21, 22 whereby the mounting plate 23 is separated from the U-shaped brackets 17, 18 so that it now rests on the pressure portions 19a, 19b of the pressure bolts 19, 20. Due to the spring-bias on the pressure bolts 19, 20 acting on the lid, lid 1b is depressed in opposition to its inherent bias and the closing force of the cassette locking mechanism reduced.

Figure 5:
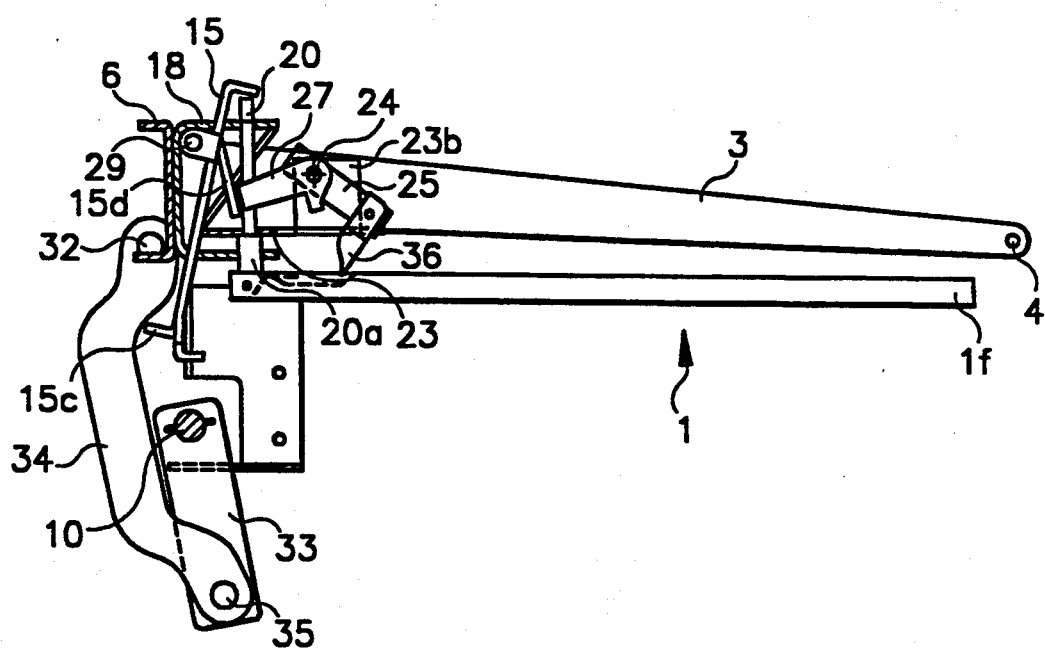

After the device has assumed the position illustrated in FIG. 5 the rotary magnet 26 is activated which drives the unlocking member 25 with the operating member 36 for clockwise rotation (in Pig. 3 it rotates counterclockwise). The wedge-shaped and concave operating surface 36a (see in particular FIG. 3) of operating member 36 is lowered into the recessed portion 1e of lid 1b to move below the locking member 1c and to pivot said member into the position shown in FIG. 6 in which it is disengaged from the locking hook 1d of the lower portion 1a (not illustrated) so that cassette 1 is unlocked.

As shown in particular in FIG. 3 the range of engagement of the wedge-shaped unlocking member 25, 36 with the recessed portion 1e is very limited and further restricted for tolerance reasons. The association according to the invention of the position of the unlocking member 25 and its operating member 36 with the pressure portions 19a, 20a of the pressure bolts 19, 20 ensures that the unlocking member 25 with its operating member 36 is lowered into the recessed portion 1e and engages below the locking member 1c respectively in always the same relationship independently of tolerance variations in the cassette's thickness. For optimum engagement the unlocking member 25 is provided with a movable operating member 36 which ensures constant engagement with the locking member 1c during unlocking and moreover allows the operating member 36 to move out of the way during entrance into the recessed portion 1e. The concave operating surface 36a initially acts on locking member 1c at a flat engagement angle which reduces the force to be exerted during unlocking, and subsequently, after unlocking, assumes a steeper engagement angle to smoothly pivot the locking member 1c into the open position.

Figure 6:
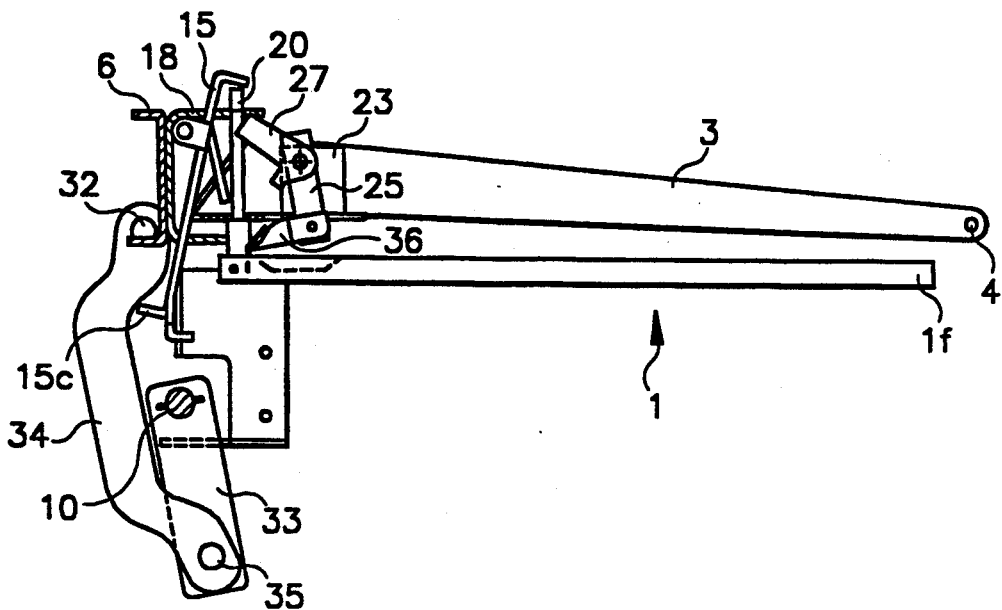

During unlocking the unlocking member 25 positively engages pawl 27 via lug 27a and pivots said pawl away from projection 15d into an inoperative position as shown in FIG. 6 in which the path of movement of the opening element 15 is cleared.

Figure 7:
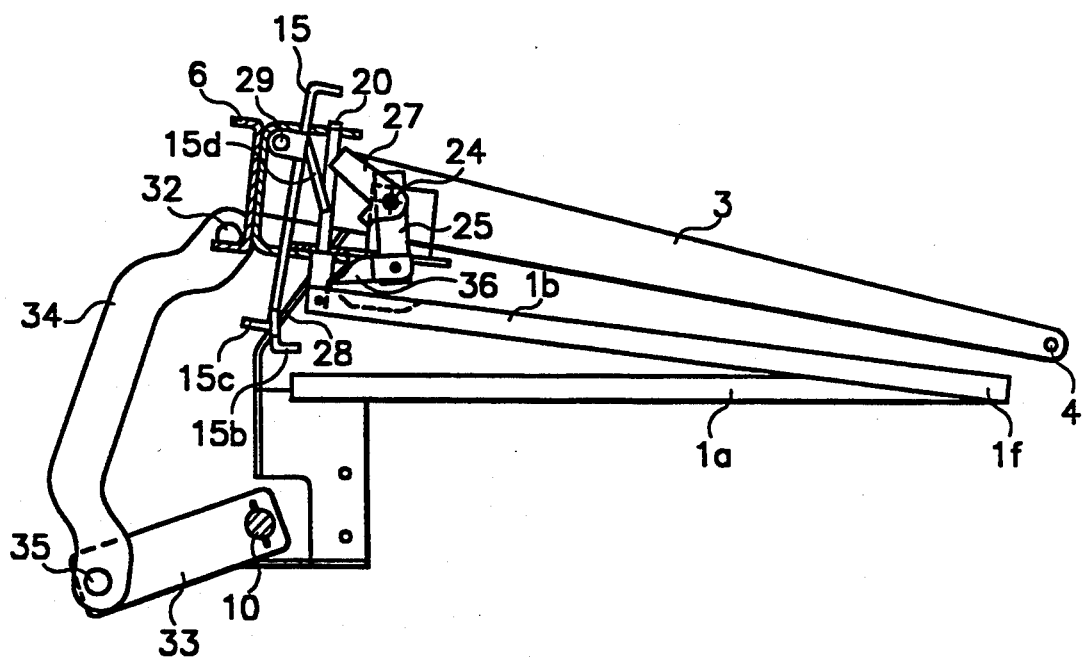
Figure 8:
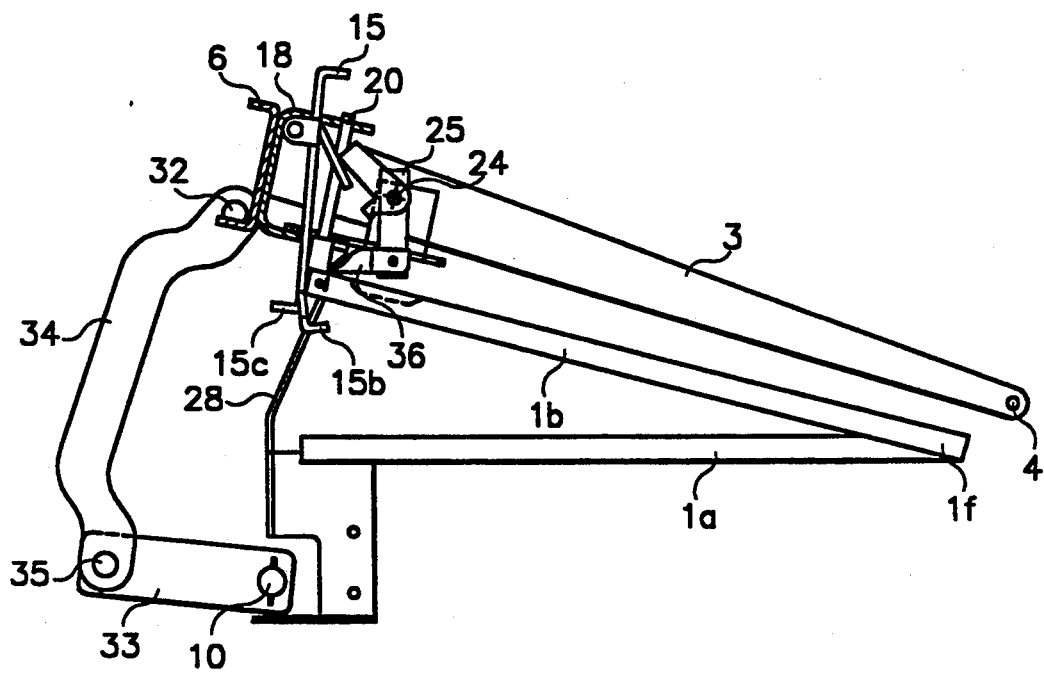
Figure 9:
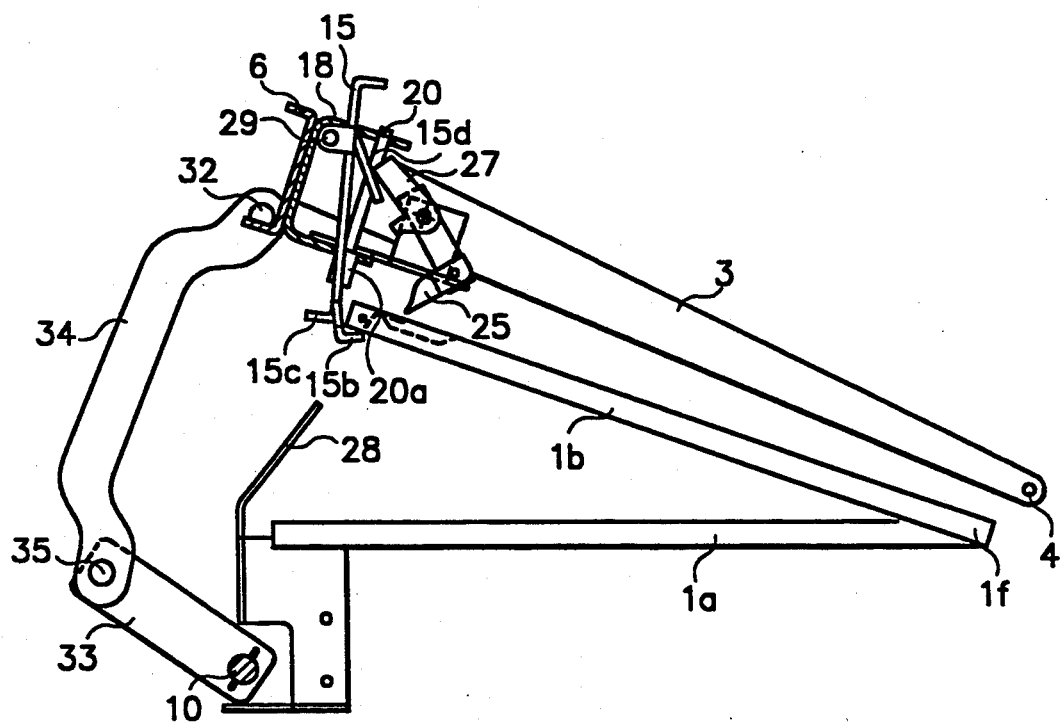

After the cassette 1 has been unlocked as described it is opened. For this purpose the motor is started again which drives the driving shaft 10 clockwise in the reverse direction. The support element 6 guided by the arms 2, 3 is moved upwards by the lever gear 7, 8, 9 and 33, 34, 35 respectively. During this movement as illustrated in FIGS. 7 to 9 the control arm 15c initially slides upwards along ramp 28 (see FIG. 7). The check-arms 15a, 15b of the opening element 15 already released by pawl 27 are thus prevented from contacting the cassette 1 before the cassette has been opened wide enough to allow proper engagement below its lid 1b.

The lid 1b is first lifted in that the unlocking member 25 and its operating member 36 respectively engage locking member 1c.

In the further course of the opening movement the control arm 15c leaves ramp 28 (see FIG. 8) so that the check arms 15a, 15b are spring-biased to move below lid 1b and automatically adjust themselves to the size-dependent pivotal path of the lid. During its further movement in the upward direction the unlocking member 25, 36 is pivoted counterclockwise by the rotary magnet 26 and returned to its initial position shown in FIG. 9 in which the lid 1b is then moved by the check arms 15a, 15b of the opening element 15 to its final open position as shown in FIG. 4. During the return movement of the unlocking member 25 and its operating member 36 just described pawl 27 escapes the projection 15d on the opening element 15 in opposition to the spring-bias thereof while remaining in its releasing position.

A sensor switch not illustrated which is arranged on the mounting plate 23 determines whether the opening element 15 has pivoted a lid 1b into its open position.

When the open position of cassette i as illustrated in FIG. 4 has been reached the actual opening operation is terminated in that a limit switch not illustrated stops the motor of driving shaft 10. Now an exposed sheet film is removed and the cassette loaded with another sheet film or an empty cassette 1 fed into the unit is loaded.

If an exposed sheet film is to be removed and adheres to the lid 1b while said lid is pivoted upwards, air is blown below the film from the end side in order to release it. For this purpose a known type of holding arrangement for blowing jets is provided (see for example DE-37 15 689-C2) which is movably arranged on the cassette lid and owing to its movable design, comes automatically to rest on the free end of the cassette lid independently of the size-responsive path of the pivotal movement thereof.

When the cassette 1 has been loaded it is closed again in that the direction of rotation of the motor of driving shaft 10 is reversed and the lever gear 7, 8, 9 and 33, 34, 35 respectively is driven counterclockwise so that the support element 6 is moved downwards into the position according to FIG. 5.

During the downward movement of support element 6 the control arm 15c of the opening element 15 once again moves into contact with the ramp 28 and pivots the check arms 15a, 15b clockwise away from cassette 1 so that the cassette can be closed without difficulty. The projection 15d of the opening element 15 which also moves back during this operation releases pawl 27 which is now spring-biased into its locking position.

Towards the end of the downward movement the spring-biased pressure bolts 19, 19a and 20, 20a urge the lid 1b downwards so that the spring-biased locking member 1c can automatically engage the locking hook 1d of the lower portion 1a so that the cassette 1 is closed and locked.

Subsequently the device is brought into its upper starting position as described and shown in FIG. 4. The unlocking member 25, 36, however, remains in its inoperative position shown in FIG. 5 so that pawl 27 also remains operative and by engaging the projection 15d keeps the check arms 15a, 15b of the opening element 15 in the position in which they are pivoted out of the way.

The loaded cassette 1 is then fed out of the device in opposition to the direction of the arrow "C".

The last-mentioned operative position of pawl 27 is also maintained if the unlocking member 25, 36 has been unable to open a cassette 1 or if a cassette 1 could not be closed. This ensures that the sequence of functions of the device is not disturbed even if the cassette does not function properly.

We claim:

1. In a device for opening and closing a sheet-film cassette with two cassette portions connected by a hinge and a locking member pivotally mounted at the free end of the cassette lid, said device comprising an unlocking member associated with said locking member and spring-biased pressure bolts associated with the area of the locking member and acting vertically on the cassette lid as well as an opening element pivoting the cassette lid into its open position, the improvement wherein said unlocking member comprises cam means for camming said locking member open while said pressure bolts are engaged so as to initially unlock the cassette, and further including means for raising said pressure bolts and said cam means vertically while said cam means is engaged with said locking member so that said lid is raised, means for pivoting said opening element from a first position disengaged with said cassette to a second position engaged with said raised lid, means for controlling said pivoting means to operate to move to said second position only when said lid is raised, and means for withdrawing said cam means from engagement with said locking member when said opening element is engaged with said raised lid.

2. A device as defined in claim 1, wherein said pressure bolts, cam means and said opening element are mounted on a U-shaped bracket attached to said opening element.

* * * * *